(12) United States Patent
Miltner et al.

(10) Patent No.: US 8,595,903 B2
(45) Date of Patent: Dec. 3, 2013

(54) SELF-LOCKING CLIP

(75) Inventors: Heinz Richard Miltner, Rosamond, CA (US); Julie Lynn Adams, Rosamond, CA (US)

(73) Assignee: Nite Ize, Inc., Boulder, CO (US)

( * ) Notice: Subject to any disclaimer, the term of this patent is extended or adjusted under 35 U.S.C. 154(b) by 320 days.

(21) Appl. No.: 12/791,697

(22) Filed: Jun. 1, 2010

(65) Prior Publication Data

US 2010/0306972 A1 Dec. 9, 2010

Related U.S. Application Data

(60) Provisional application No. 61/217,878, filed on Jun. 5, 2009.

(51) Int. Cl.
*F16B 2/20* (2006.01)

(52) U.S. Cl.
USPC ........... 24/3.11; 24/3.12; 24/338; 24/498; 24/511

(58) Field of Classification Search
USPC .............. 24/3.11, 3.12, 170, 338, 498, 511
See application file for complete search history.

(56) References Cited

U.S. PATENT DOCUMENTS

| | | | | |
|---|---|---|---|---|
| 463,351 A | * | 11/1891 | Elliot | 24/498 |
| 534,044 A | * | 2/1895 | Harding | 24/498 |
| 668,088 A | * | 2/1901 | Bruce | 24/3.12 |
| 706,522 A | * | 8/1902 | Bryant | 24/498 |
| 716,472 A | * | 12/1902 | Pilcher | 24/498 |
| 745,990 A | * | 12/1903 | Baker | 24/498 |
| 748,277 A | * | 12/1903 | Gigyere | 24/498 |
| 748,423 A | * | 12/1903 | Schaffner | 24/538 |
| 1,070,403 A | * | 8/1913 | Bryant | 24/498 |
| 1,417,129 A | * | 5/1922 | Armstrong | 24/508 |
| 2,138,978 A | | 12/1938 | Meine | |
| 2,168,946 A | * | 8/1939 | Rogers | 24/66.4 |
| 2,264,009 A | * | 11/1941 | Stark | 24/504 |
| 2,300,068 A | * | 10/1942 | Silverman | 24/66.13 |
| 2,327,741 A | * | 8/1943 | Poole | 24/170 |
| 3,086,266 A | * | 4/1963 | Schupbach | 24/66.13 |
| 3,182,368 A | * | 5/1965 | Fair | 24/347 |
| 4,536,925 A | * | 8/1985 | Boothe et al. | 24/511 |
| 4,667,374 A | | 5/1987 | Bianchi | |
| 4,821,934 A | | 4/1989 | Alessi et al. | |
| 4,956,895 A | * | 9/1990 | Hayasaka | 24/3.11 |
| 5,379,490 A | * | 1/1995 | Wandt et al. | 24/3.11 |
| 5,528,770 A | | 6/1996 | Castilla et al. | |
| 5,533,656 A | * | 7/1996 | Bonaldi | 224/667 |
| 6,101,689 A | * | 8/2000 | Jo | 24/338 |

(Continued)

*Primary Examiner* — Robert J Sandy
*Assistant Examiner* — David Upchurch
(74) *Attorney, Agent, or Firm* — Patton Boggs LLP

(57) ABSTRACT

A self-locking clip may include a first member configured to attach to an item, the first member having a tongue arranged adjacent the item when the first member is attached to the item, the tongue configured to allow an article to be received between the tongue and the item when the first member is attached to the item; a second member pivotally attached to the first member, the second member having at least one engagement surface for engaging the article, when the first member is attached to the item and the article is received between the tongue and the item; and a bias member arranged to bias the second member to pivot in a direction to urge the at least one engagement surface toward the article to engage the article, when the first member is attached to the item and the article is received between the tongue and the item.

19 Claims, 4 Drawing Sheets

(56) References Cited

U.S. PATENT DOCUMENTS

| | | |
|---|---|---|
| 6,125,513 A | 10/2000 | Cheraso et al. |
| 6,145,169 A | 11/2000 | Terzuola et al. |
| 6,161,741 A | 12/2000 | French |
| 6,443,340 B1 | 9/2002 | Chung et al. |
| 6,470,535 B1 | 10/2002 | Mayne et al. |
| 6,510,592 B1 | 1/2003 | Hamilton |
| 6,752,299 B2 | 6/2004 | Shetler et al. |
| 2002/0023469 A1* | 2/2002 | Lee .............................. 70/456 R |
| 2007/0226958 A1 | 10/2007 | Clifton |

* cited by examiner

SELF-LOCKING CLIP

CROSS-REFERENCE TO RELATED PATENT APPLICATIONS

This application claims priority from U.S. Provisional Application No. 61/217,878, filed Jun. 5, 2009, incorporated herein by reference in its entirety.

BACKGROUND

1. Field of the Invention

Embodiments of the present invention generally relate to clip members, and, in specific embodiments, to self-engaging clip members.

2. Related Art

There are many different organizational and attachment systems, including clips, for carrying and securing various items such as personal equipment, mobile devices, and accessories to a user or an article associated with the user, such as a pants pocket, belt, purse, jacket, and/or the like. However, most clips designed for attaching items such as personal equipment, mobile devices, and accessories hold onto the user or article with tension and friction.

Some clips lock to a user or an article. These clips may include a strong spring that allows the clips to lock to the article. However, these clips can be more complicated and expensive to build. In addition, the holding force of the clip is only as strong as that of its spring. Accordingly, the spring cannot be too strong or the user will not be able to press and/or depress the spring. Likewise, if the spring is not strong enough, the clip cannot be properly secured to the article. Furthermore, these locking clips can require the user to depress the spring (and overcome the force of the spring) to move the clip to an unlocked position in order to insert or engage (or otherwise lock) the clip to the attached article. Moreover, over time the pressure from a strong spring-loaded locking clip can damage the material or article (e.g., pants or jacket pocket, gear bag, nylon strap, vest, purse, belt, boot, and/or the like) to which it is clipped.

SUMMARY OF THE DISCLOSURE

A clip for attachment to an item and for selectively securing the item to an article may include, but is not limited to, a first member, a second member, and a bias member. The first member may be configured to attach to an item. The first member may have a tongue that is arranged adjacent the item when the first member is attached to the item. The tongue may be configured to allow an article to be received between the tongue and the item when the first member is attached to the item. The second member may be pivotally attached to the first member. The second member may have at least one engagement surface for engaging the article, when the first member is attached to the item and the article is received between the tongue and the item. The bias member may be arranged to bias the second member to pivot in a direction to urge the at least one engagement surface of the second member toward the article to engage the article, when the first member is attached to the item and the article is received between the tongue and the item.

In various embodiments, the tongue may be biased toward the item, when the first member is attached to the item. In various embodiments, the first member may include a base portion having a first surface and a second surface. The second surface may be attachable to the item. The first surface may face away from the item when the second surface is attached to the item. The tongue may be biased toward the first surface of the base.

In various embodiments, the first member may include a base portion having a first surface and a second surface. The second surface may be attachable to the item. The first surface may face away from the item when the second surface is attached to the item. The bias member may be arranged to bias the second member to pivot the at least one engagement surface of the second member toward the first surface of the base portion. In some embodiments, the second member may include a surface for receiving a force from a user in a direction for pivoting the second member relative to the first member against a bias force of the bias member, to urge the at least one engagement surface of the second member away from the first surface of the base portion.

In various embodiments, the bias member may include a portion of the first member configured to provide a bias force against the second member. In various embodiments, the first member and the bias member comprise a unitary structure formed from a single piece of metal. In various embodiments, the at least one engagement surface of the second member may include two engagement surfaces.

In various embodiments, the at least one engagement surface of the second member may have a generally pointed tip for engaging the article when the first member is attached to the item and the article is received between the tongue and the item. In various embodiments, wherein the second member may include a surface for receiving a force from a user in a direction for pivoting the second member relative to the first member against a bias force of the bias member, to urge the at least one engagement surface of the second member away from the article, when the first member is attached to the item and the article is received between the tongue and the item.

In various embodiments, the second member may have a surface configured to receive a force from the article to pivot the second member relative to the first member in the direction to urge the at least one engagement surface of the second member toward the article and increase a force of engagement of the at least one engagement surface on the article to further inhibit the article from being removed from between the tongue and the item, when the first member is attached to the item and the article is received between the tongue and the item. In various embodiments, the second member may include a surface for receiving a force from a user in a direction for pivoting the second member relative to the first member against a bias force of the bias member. The second member may be configured to allow the article to be engaged by the at least one engagement surface of the second member before receiving the force from the user on the surface of the second member. In various embodiments, the second member may be configured to automatically engage the article with the at least one engagement surface as the article is received between the at least one engagement surface and the item.

A method of making a clip for attachment to an item and for selectively securing the item to an article, the method may include, but is not limited to, any one of or combination of: (i) configuring a first member to attach to an item; (ii) providing the first member with a tongue in a position to be adjacent the item when the first member is attached to the item, the tongue configured to allow an article to be received between the tongue and the item when the first member is attached to the item; (iii) attaching a second member to the first member for pivotal movement of the second member relative to the first member; (iv) providing the second member with at least one engagement surface for engaging the article when the first member is attached to the item and the article is received between the tongue and the item; and (v) arranging a bias member in a position to bias the second member to pivot relative to the first member in a direction to urge the at least one engagement surface of the second member toward the article to engage the article when the first member is attached to the item and an article is received between the tongue and the item.

In various embodiments, providing the first member with the tongue may comprise providing a bias force to biasing the tongue toward the item when the first member is attached to the item. In some embodiments, configuring the first member may comprise configuring a base portion having a first surface and a second surface. The second surface may be attachable to the item. The first surface may face away from the item when the second surface is attached to the item. Providing the first member with the tongue may comprise biasing the tongue toward the first surface of the base.

In various embodiments, configuring the first member may comprise configuring a base portion having a first surface and a second surface. The second surface may be attachable to the item. The first surface may face away from the item when the second surface is attached to the item. Arranging the bias member may comprise arranging the bias member to bias the second member to pivot the at least one engagement surface of the second member toward the first surface of the base portion. In some embodiments, providing the second member may comprise providing a body having a surface for receiving a force from a user in a direction for pivoting the body relative to the first member against a bias force of the bias member, to urge the at least one engagement surface away from the first surface of the base portion.

In various embodiments, the bias member may include a portion of the first member configured to provide a bias force against the second member. In various embodiments, providing the first member may comprise forming the first member and the bias member as a unitary structure from a single piece of metal. In various embodiments, the at least one engagement surface comprises two engagement surfaces.

In various embodiments, the at least one engagement surface of the second member may have a generally pointed tip for engaging the article when the first member is attached to the item and the article is received between the tongue and the item. In various embodiments, providing the second member may comprise providing a body having a surface for receiving a force from a user in a direction for pivoting the body relative to the first member against a bias force of the bias member, to urge the at least one engagement surface in a direction away from the article when the first member is attached to an item and an article is received between the tongue and the item.

DETAILED DESCRIPTION

Figure 1:
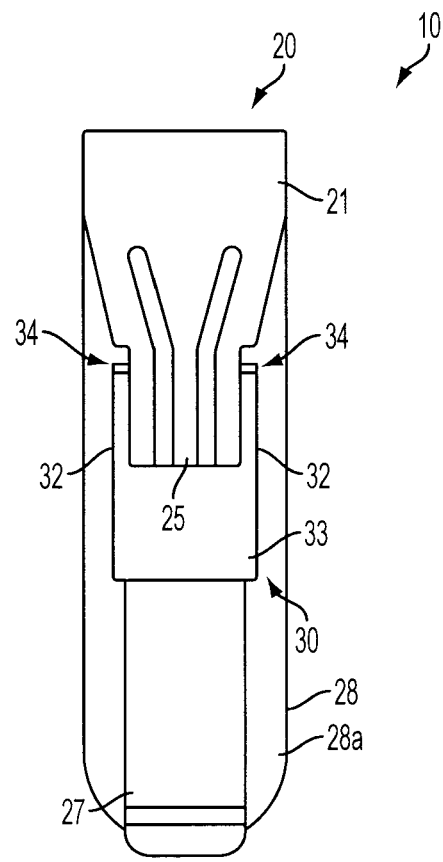
FIG. 1 is a top, elevated view of a clip member according to an embodiment of the present invention.
Figure 2:
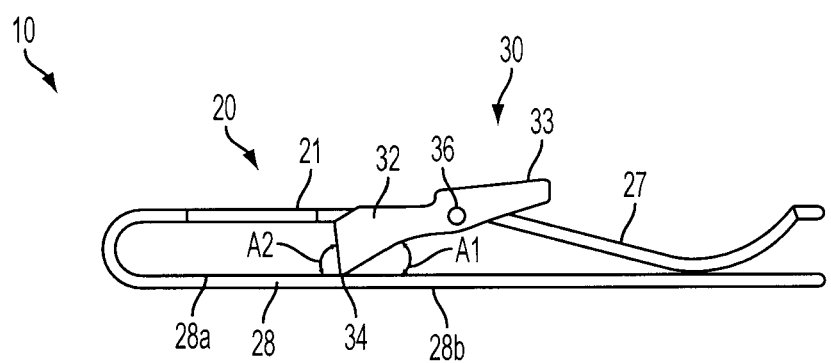
FIG. 2 is a side view of a clip member in a locked position according to an embodiment of the present invention.
Figure 3:
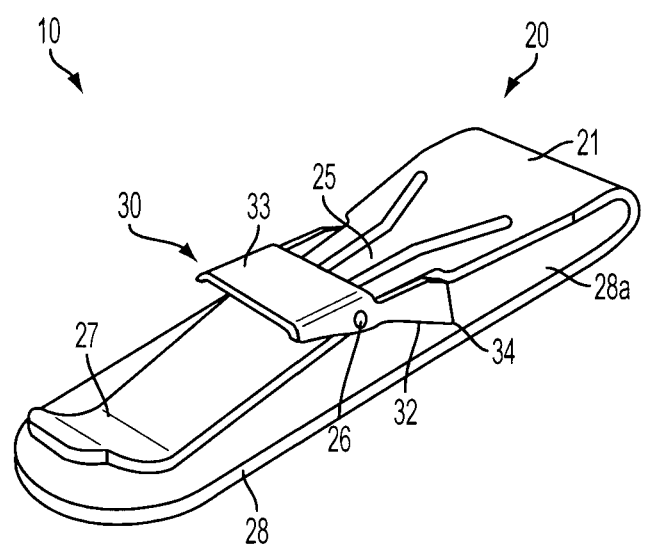
FIG. 3 is a side, elevated view of a clip member in a locked position according to an embodiment of the present invention.

FIGS. 1-3 illustrate a clip member 10 according to an embodiment of the present invention. In particular, FIG. 1 is a top, elevated view of the clip member. FIG. 2 is a side view of the clip member 10 in a locked position (to receive and securely hold an article). FIG. 3 is a side, elevated view of the clip member 10 in a locked position.

The clip member 10 may be used to clip various items such as personal equipment, mobile devices, and accessories including, but not limited to, tools, electronic devices, weapons, gear pouches, safety equipment, and/or the like (or a product used with such an item, such as, but not limited to, a mobile phone case, key ring or chain, and/or the like) to an article such as (but not limited to) a pants pocket (e.g., 101 in FIG. 7) or other pocket (of varying shapes and sizes), a shirt collar, pants waistband, belt, hat, purse, briefcase, gear bag, backpack, MOLLE compatible webbing system, a shoe or boot, an elastic band, and/or the like. In specific embodiments, the clip member 10 may be MOLLE (Modular Lightweight Load-carrying Equipment) compatible. In other embodiments, the item attachable to the clip member need not be a personal or otherwise portable device. For example, the clip member 10 may be attached to objects other than a person (or objects carried by a person) including, but not limited to, a wall or other mounting surface, filing cabinet, desk or other furniture, refrigerator or other appliance, and/or the like.

The first member 20 and/or the second member 30 (or any one or more part thereof) may be made of any suitably rigid material (or combination of materials) including, but not limited to metal, alloy, plastic, rubber, composite material (e.g., carbon fiber), wood, ceramic, and/or the like.

With reference to FIGS. 1-3, the clip member 10 may include a first member 20 and a second member 30. The first member 20 may include a base 28 and a body 21. In some embodiments, the base 28 may be integral to the body 21, for example, formed together. In other embodiments, the base 28 may be connected to the body 21 in any suitable manner, for example (but not limited to) with one or more screws (or other fasteners), glue, epoxy, double sided bonding tape, molded or welded together, and/or the like. The base 28 may have a first surface 28a and a second surface 28b. The first surface 28a may face the body 21.

In addition, the shape of the base 28 may be substantially rectangular as shown in FIGS. 1-3. In other embodiments, however, the base 28 may have any suitable shape and size. In some embodiments, the base 28 (or a portion thereof or the body 21) may be attached to an item (e.g., 100 in FIG. 5), such as a mobile phone, pager, mobile device, and/or the like or product used with the item (e.g., mobile phone case, key ring, and/or the like) in any suitable manner including (but not limited to) with one or more screws (or other fasteners), glue, epoxy, double sided bonding tape, molded or welded together, and/or the like). For instance, the base 28 may include an adhesive material on the second side 28b of the base 28 (e.g., the side facing away from the body 21) that adheres to the item. As another example, the base 28 may include or be used with a magnet for attracting to the base 28 (or other component) and/or the item. The magnet may be magnetically coupled to a metallic item or the like to couple the clip member 10 to the metallic item. In further embodiments, the magnet may include an adhesive material (as above) on an opposite side from the side coupled to the clip member 10.

In particular embodiments, the base 28 (or a portion thereof) or the body 21 may be molded or welded or to or otherwise made part of the item. For instance, a portion of the clip member 10 (e.g., the base 28 or portion thereof) may be molded into the item or other product, such as a rigid (or soft) mobile phone case and/or the like. For example, when the phone case is manufactured, the base 28 may be encased in plastic (or other material) (e.g., FIGS. 4-5). Accordingly, when the clip member 10 is clipped to an article, the article passes between the tongue 27 and the surface of the case, and when locked, the article is pressed against the surface of the case by the engagement ends 34 (discussed later). Thus, in various embodiments, the clip member 10 (or portions thereof) may be a component or otherwise part of a manufactured item (or product). It should be noted that reference to the base 28 or surface thereof (e.g., first surface 28*a*) of the clip member 10 may also include embodiments in which the item itself is the base or provides the surface against which the engagement ends 34 press an article (as described later).

In other embodiments, the base 28 (or the body 21 itself) may be attached, mounted, assembled, or formed integral with an item in any suitable manner. For instance, the clip member 10 and/or the base 28 can be assembled into a product such as a pocketknife or a flashlight (or other item). In some embodiments, the base 28 may be, include, or be formed with an attachment body (not shown) configured to fit to the item (e.g., flashlight) in any suitable manner including, but not limited to, a snap fitting, friction fitting, press fitting, with an adhesive, fastener, and/or the like. For example, for a clip member 10 configured to fit to a flashlight or other cylinder-shaped item, the attachment body may be (but not limited to) a "C"-shaped (to fit or snap to the flashlight) or annular ring (to slip over an end of the flashlight). In further examples, the attachment body may be received into a groove or the like of the flashlight (or other item). The above examples relate to flashlights and other cylinder-shaped items. However, in other embodiments, the clip member 10 may be configured to fit to any sized, shaped, and/or dimensioned item. As another example, the base 28 (or the body 21 itself) may be fastened (e.g., screwed) to a handle of a foldable pocketknife or the like.

In various embodiments, the body 21 may include a tongue 27 or the like. The tongue 27 may be biased with a bias force toward the first surface 28*a* of the base 28 (i.e., in a direction toward the article when the article is received between the body 21 and the item as described later). The bias force may be selected or otherwise set based on the material used to make the first member 20 (or the tongue 27 by itself). In various embodiments, the bias force of the tongue 27 may be less than a bias force provided by a bias member 25, as described later.

In the embodiments shown in FIGS. 1-3, the tongue 27 may have a substantially rectangular shape extending in a longitudinal direction. However, in other embodiments, the tongue 27 may have any suitable shape, curvature, and/or decoration (e.g., FIGS. 4-6). In various embodiments, the tongue 27 may be integral with the body 21. In other embodiments, the tongue 27 may be connected to the body 21 in any suitable manner, for example, as described with respect to the body 21 and the base 28.

In various embodiments, the body 21 (including the tongue 27) and the base 28 may each have a length dimension that is substantially equal to each other (e.g., FIG. 1). In other embodiments, the length dimension of the body 21 and the base 28 may be different. For instance, the length dimension of the body 21 may be greater than the length dimension of the base 28. Alternatively, the length dimension of the body 21 may be less than the length dimension of the base 28 (e.g., FIG. 5). For instance, a longer base 28 could allow for facilitated attachment of a key ring or the like to an end (or other suitable location) of the base 28.

The first member 20 (e.g., the base 28, the body 21, and the tongue 27) may be for receiving an article such as (but not limited to) fabric of a pants pocket (e.g., 101 in FIG. 7) or other pocket (of varying shapes and sizes), a shirt collar, pants waistband, any suitable portion of an article of clothing, belt, hat, purse, briefcase, gear bag, backpack, MOLLE compatible webbing system, a shoe or boot, an elastic band, and/or the like. In particular, the first member 20 may be placed over the article to receive a portion of the article into the first member 20.

The second member 30 may be supported on the first member 20 for movement toward and away from the first surface 28*a* of the base 28. In some embodiments, the first member 20 may include one or more pivot points 26 (or rotational axes) about which the second member 30 pivots (or rotates) relative to the first member 20. The pivot points 26 may include one or more protrusions received in one or more recesses 36 of the second member 30 to allow the one end of the second member 30 to pivot to and away from the first surface 28*a* of the base 28. In other embodiments, the locations of the protrusion(s) and recess(es) may be reversed such that the second member 30 may include protrusions (not shown) received in one or more recesses (not shown) of the first member 20 to allow the end of the second member 30 to pivot to and away from the first surface 28*a* of the base 28.

The second member 30 may include a pressing area 33 for selectively moving the second member 30 toward and away from the first surface 28*a* of the base 28. Accordingly, the second member 30 can be selectively pivoted by applying a force upon the pressing area 33 of the second member 30. The pressing body may include one or more arms 32 for movement with the second member 30. Each of the arms 32 may include an engagement end 34 for contacting or otherwise operatively engaging the first surface 28*a* of the base 28 (or portion of the article positioned between the first surface 28*a* of the base 28 and the second member 30).

In some embodiments, in the locked position (e.g., before an article is received into the clip member 10), the engagement ends 34 (and/or the arms 32) and the first surface 28*a* of the base 28 may form an angle A1 of less than 90 degrees (facing a receiving direction in which an article may be received into the clip member 10) (e.g., FIG. 2). The formed angle A1, for example, may help guide the article under the engagement ends 34 (and/or the arms 32) as the article is received into the clip member 10 (in the receiving direction (relative to the clip member 10)). This may urge the engagement ends 34 upward and allow continued movement of the article in the receiving direction. As such, a force provided by the article (in the receiving direction) may be sufficient to overcome a bias force of a bias member 25 (described below) to urge the engagement ends 34 away from the base 28 (e.g., away from the locked position). Once the force provided by the article (in the receiving direction) is less than the bias force of the bias member 25 (e.g., the article is no longer moving in the receiving direction), the bias member 25 may urge the engagement ends 34 toward the base 28 (e.g., toward the locked position) to securely hold the article in place.

In some embodiments, in the locked position (e.g., an article is received between the engagement ends 34 and the base 28 (or item)), the engagement ends 34 (and/or the arms 32) and the first surface 28a of the base 28 may form an angle A2 of less than 90 degrees (facing opposite the receiving direction in which the article was received) (e.g., FIG. 2). The formed angle A2 may cause a force, which is provided from the article as the user (or other force) attempts to remove the article (in a removal direction, which is opposite the receiving direction), to (further) urge the engagement ends 34 toward the first surface 28a of the base 28. Accordingly, the engagement ends 34 may be urged further toward the base 28, and thus increase the holding ability of the clip member 10 in direct proportion to the force with which the user (or the like) is attempting to remove the article.

In various embodiments, the engagement ends 34 may be pointed. In other embodiments, the engagement ends 34 may be, but not limited to, smooth, round, flat (e.g., to be parallel with the first surface 28a of the base 28 when the engagement ends 34 engage the first surface 28a (or the article to which the clip member 10 is being clipped)), and/or the like. In some embodiments, the first surface 28a of the base 28 may include one more recesses (not shown) for receiving at least a portion of the engagement ends 34 and/or a portion of the article pushed into the recess(es) by the engagement ends 34. Such embodiments, for example, may provide additional locking or gripping between the engagement ends 34 and the base 28 of the clip member 10. In other embodiments, each of the engagement ends 34 may include a recess or other curvature for receiving a protrusion (not shown) or the like arranged on the first surface 28a of the base 28. As above, such embodiments, for example, may provide additional locking or gripping between the engagement ends 34 and the base 28 of the clip member 10.

In some embodiments, the engagement ends 34 may be sized and shaped as appropriate. In some embodiments, for example, the engagement ends 34 (and/or the one or more arms 32) may be formed as one continuous member for engaging an article received into the first member 20. In some embodiments, the engagement ends 34 may extend in the same direction as the arms 32. In other embodiments, the engagement ends 34 may protrude from the arms 32, for example toward the first surface 28a of the base 28 (e.g., FIG. 2).

In various embodiments, the clip member 10 may include one or more friction members (not shown) strategically arranged along the clip member 10, for example, to provide further holding or gripping strength. For instance, a friction member may be arranged on each of the engagement ends 34 (and/or the recesses for receiving the engagement ends 34) to increase friction with the article, and thus the holding ability of the clip member 10 to the article to which the clip member 10 is clipped. The friction member(s) may be made of any suitable material (or combination of materials) for providing friction, such as, but not limited to, rubber and/or the like. In some embodiments, the clip member 10 may include one or more portions with a rough or textured surface or the like for providing increased friction between the clip member 10 and the article. For example, the first surface 28a of the base 28 may have one more rough or textured surfaces to increase friction between the article and the base 28.

A bias member 25 (e.g., spring, leaf spring, or the like) may be positioned to provide a bias force on the second member 30 (e.g., on a bottom surface of the second member 30 opposite the pressing area 33). In the illustrated embodiments, the bias member 25 is positioned between the first member 20 and the second member 30. However, in other embodiments, the bias member 25 may be positioned at any suitable location for providing a bias force on the second member 30.

The bias member 25 may urge the pressing surface 33 of the second member 30 upward (in the orientation of FIGS. 1-3) to cause the arms 32 to pivot downward (in the orientation of FIGS. 1-3) about the pivots 26. As the arms 32 pivot downward, the engagement ends 34 engage (i.e., contact and hold) the article positioned between the first surface 28a of the base 28 and the second member 30. The bias member 25 may be configured or otherwise selected to provide a bias force sufficient to leverage the pressing area 33 (and the arms 32 and engagement ends 34) of the second member 30 upward (in the orientation of FIGS. 1-3), yet allow a user to apply a greater force than the bias force upon the pressing body 33 to urge and move the second member 30 in the opposite direction against the bias force of the bias member 25.

In some embodiments, the bias member 25 may be made integral with the body 21 of the first member 20. For instance, the bias member 25 may be a resilient portion of the body 21 arranged to provide the bias force (or similar tension) on the second member 30. In such embodiments, the user may apply a force (e.g., press) on the pressing area 33 to pivot the arms 32 upward. When the user stops pressing on the pressing area 33 (or the force provided by the resilient portion otherwise becomes greater than the force on the pressing area 33), the resilient portion may urge the arms 32 downward toward the first surface 28a of the base 28. In such embodiments, for example, when the pressing area 33 is pressed, the pressing area 33 may urge the resilient portion toward the base 28. Once released, the resilient portion may once again move away from the base 28. In some embodiments, the body 21 may include at least one groove or cutout area separating the body 21 (or the tongue 27) and the resilient portion.

In particular embodiments, the resilient portion may extend or otherwise protrude from the body 21 (in a direction angled away from the base 28 and toward the tongue 27) to contact or otherwise engaged the underside of the pressing area 33. As such, the resilient portion extends away from the base 28 at an angle of less than 90 degrees (facing the direction in which an article may be received) (e.g., FIG. 2). In further embodiments, the second member 30 (including the pressing area 33, the arms 32, and the engagement ends 34) may be supported on the first member 20 to be at an angle of less than 90 degrees (facing the direction in which an article may be received) (e.g., FIG. 2). Thus, in these embodiments, for example, the resilient portion and the second member 30 may be orientated in substantially the same (or parallel) directions. As discussed, such a configuration may allow for a self-locking clip member 10.

In other embodiments, the resilient portion of the base 28 may extend or otherwise protrude from the tongue 27 (in a direction angled away from the base 28 and away from the tongue 27) to come in contact with the underside of the pressing area 33. As such, the resilient portion extends away from the base 28 at an angle of greater than 90 degrees (facing the direction in which an article may be received) (e.g., FIG. 5). Put another way, the resilient portion extends away from the base 28 at an angle of less than 90 degrees (facing the direction in which an article may be removed) (e.g., FIG. 5). Thus, in these embodiments, for example, the resilient portion and the second member 30 may be orientated in opposing directions. However, these embodiments operate similar to those in which the resilient portion and the second member 30 are orientated in substantially the same (or parallel directions) (e.g., FIG. 2).

In other embodiments, the bias member may be a coil spring (or any other suitable biasing member) positioned between (or any other suitable location to provide a biasing force) the first member 20 and the second member 30 to allow the coil spring to provide the bias force on the second member 30.

To use the clip member 10, the user may first slide or otherwise move the tongue 27 of the clip member 10 over an article so that the article is positioned between the base 28 and the tongue 27 of the body 21. The user may continue to slide or otherwise move the clip member 10 relative to the article beyond the engagement ends 34 of the arms 32 of the second member 30. As the article is moved toward the engagement ends 34 of the arms 32, the article may press on the arms 32 forcing the engagement ends 34 of the arms 32 up and away from the first surface 28a of the base 28. In other words, a force from the clip member 10 being moved relative to the article may be sufficient to overcome the bias force of the bias member 25 to urge and move the arms 32 upward and allow the article to pass between the engagement ends 34 and the base 28. In various embodiments, if desired, the pressing area 33 may be pressed to raise the arms 32 and engagement ends 34 of the arms 32 whereupon the article may be received into the clip member 10 past the engagement ends 34 of the arms 32.

Once the clip member 10 is no longer being moved relative to the article, the bias member 25 may urge the arms 32 downward so that the engagement ends 34 contact (or otherwise operatively engage) and securely hold the article. In other words, once the bias force of the bias member 25 is greater than the force from the clip member 10 being moved relative to the article, the bias member 25 may urge the arms 32 downward to engage the article. The engagement ends 34 may substantially prevent the article from being moved (relative to the clip member 10) in an opposite direction from which the article was inserted into the clip member 10 without damaging the article unless the pressing area 33 is pressed by the user to overcome the bias force of the bias member 25 and pivot the arms 32 upward to disengage the article. In addition, an opposing force created from an attempt to move the article (relative to the clip member 10) in the opposite direction may further urge the arms 32 of the second member 30 downward toward the article and the first surface 28a of the base 28. Thus, as the opposing force increases, the holding strength or ability of the clip member 10 may increase accordingly.

Thus, in various embodiments, a clip member 10 may include a first member 20 moveable relative to a second member 30. The second member 30 may include one or more arms 32 with a pressing area 33 positioned on top (or other suitable location) of the clip member 10. The one or more arms 32 may be appropriately biased (e.g., spring-loaded) to urge engagement ends 34 of the arms 32 to securely grip an article to which the clip member 10 is being clipped. For instance, a bias member 25 may be configured or otherwise selected to provide a force on the second member 30 sufficient to move or leverage the engagement ends 34 of the arms 32 into a position where the engagement ends 34 contact the article (e.g., pants pocket) to which the user wants to clip the clip member 10. In these embodiments, for example, the clip member 10 may not hold and lock the article based solely (or at all) on the bias force of the bias member 25. Instead, as previously discussed, the configuration of the second member 30, which may include, for example, providing the one or more arms 32 and/or the engagement ends 34 having a certain angle, allows the clip member 10 to receive the article without depressing the pressing area 33 and allows the clip member 10 to clip to and securely hold the article received in the clip member 10. Thus, the clip member 10 may automatically engage or lock the article as the article is received.

Once the clip member 10 is clipped to the article, attempting to forcibly pull out or release the article to which the clip member 10 is clipped without depressing the pressing area 33 of the second member 30 of the clip member 10 may cause the arms 32 (and/or the engagement ends 34) to remain in the locked position and force the arms 32 further toward the base 28 of the clip member 10 to grip the article with added strength. The stronger the force at which the article is forcibly pulled (without depressing the pressing area 33), the stronger the force at which the clip member 10 holds or grips the article in place.

In various embodiments, the one or more arms 32 may be configured to be self-activating in that the user does not need to unlock or otherwise ready the clip member 10 before clipping the clip member 10 to an article. Therefore, when the user wants to clip the clip member 10 to an article, the user may simply slide the clip member 10 over the article whereupon the clip member 10 automatically engages or locks the article in place.

In further embodiments, locating the pressing area 33 on top of the clip member 10 (in the orientation of FIGS. 1-3) conveniently allows the user to depress the pressing area 33 to release the article simultaneously as the user grasps and deploys the article to which the clip member 10 is clipped.

Figure 4:
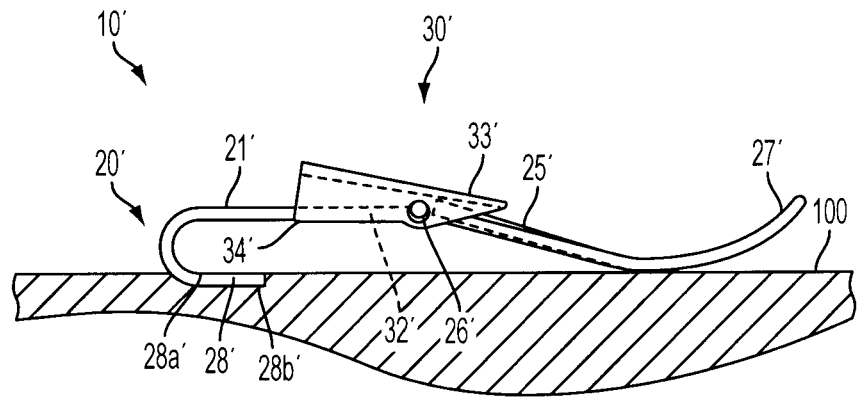
FIG. 4 is a side view of a clip member in an unlocked position according to an embodiment of the present invention.
Figure 5:
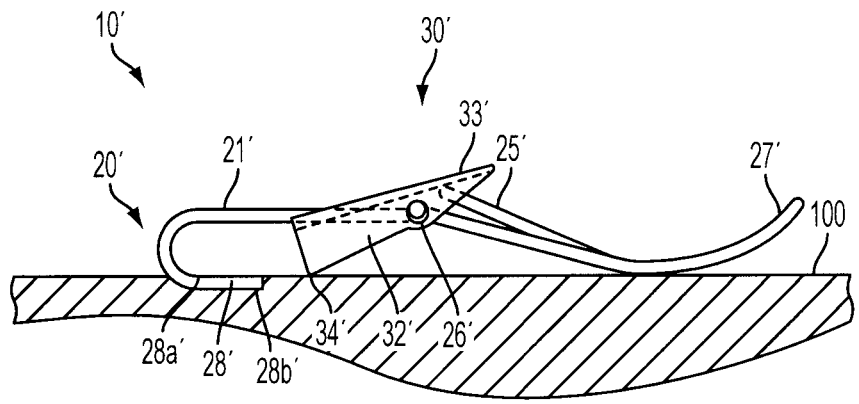
FIG. 5 is a side view of a clip member in a locked position according to an embodiment of the present invention.
Figure 6:
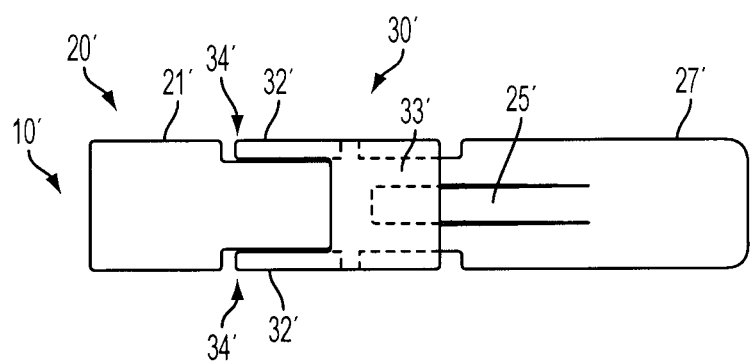
FIG. 6 is a top, elevated view of a clip member according to an embodiment of the present invention.

FIGS. 4-6 illustrate a clip member 10' according to an embodiment of the present invention. The clip member 10' and components thereof may be substantially the same as described above with respect to the clip member 10 (FIGS. 1-3), however, with a different configuration, for example, for the base 28', the body 21', and the bias member 25'. FIG. 4 is a side view of the clip member 10' in an unlocked position (to allow release of a clipped article) and mounted to an item 100. FIG. 5 is a side view of the clip member 10' in a locked position (to receive and securely hold an article). FIG. 6 is a top, elevated view of the clip member 10'.

With reference to FIG. 4, the clip member 10' is shown in the unlocked position, which may be obtained, for instance, by pressing on the pressing area 33' (e.g., with a user's finger) with sufficient force to overcome the bias force provided by the bias member 25' to urge the arms 32' to pivot (about the pivots 26') upward (in the orientation of FIG. 4), thus disengaging (e.g., no longer contacting) the engagement ends 34' of the arms 32' from an article to which the clip member 10' is clipped. Accordingly, the user may remove the clip member 10' from the article.

With reference to FIG. 5, once the pressing area 33' is released (or the force upon the pressing area 33' otherwise becomes less than the bias force of the bias member 25'), the bias member 25' may urge the arms 32' to pivot downward into the locked or engaged position. As discussed, in this position, the clip member 10' (with or without the attached item 100) may be clipped to an article by moving the clip member 10' over the article to place the engagement ends 34' of the arms 32' of the second member 30' over the article. Thus, in some embodiments, the engagement ends 34' may press against the article to press the article against some other surface (e.g., the surface of the item 100) other than the base 28'. In addition, in this position, in a case where an article to which the clip member 10' is already clipped, the engagement ends 34' of the second member 30 may securely hold the article in place and substantially prevent the article from being removed from the clip member 10'.

In various embodiments, such as those shown in FIGS. 4-6, the bias member 25' may face in an opposite direction from a direction that bias member 25 of the clip member 10 faced (e.g., FIGS. 1-3). In addition, as noted, various components, such as (but not limited to) the base 28', the one or more arms 32', the engagement ends 34', and the tongue 37' may be sized, shaped, and/or decorated in any suitable manner, for example, as shown in FIGS. 4-6.

Figure 7:
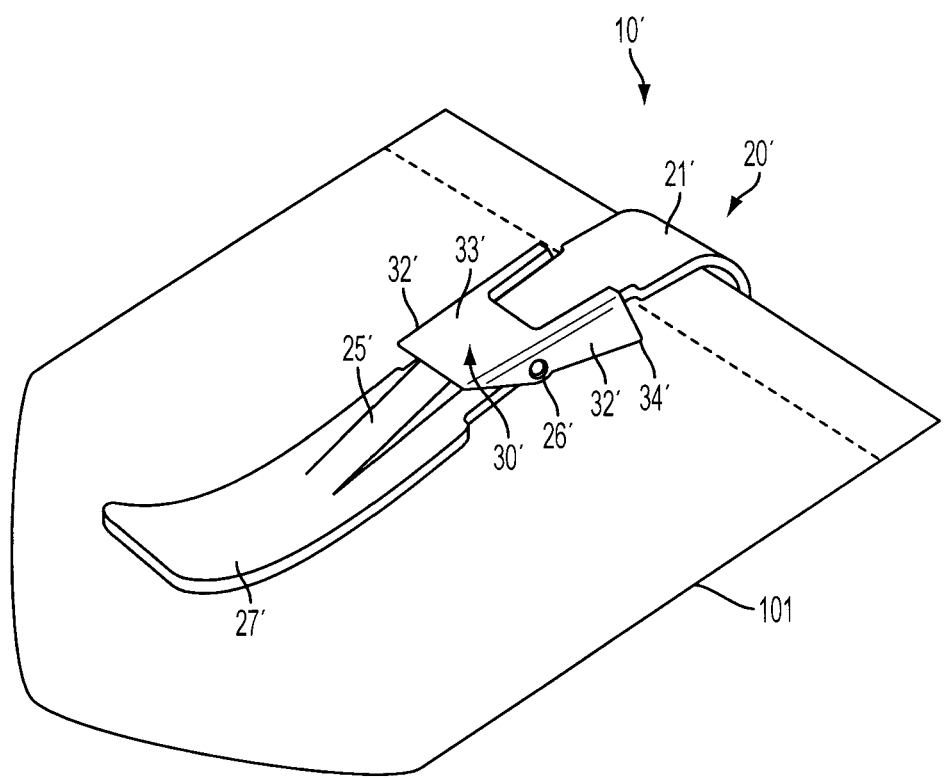
FIG. 7 is a side, elevated view of a clip member engaged with an exemplary article of clothing according to an embodiment of the present invention.

FIG. 7 is a side, elevated view of the clip member 10' of FIGS. 4-6 (and/or the clip member 10 of FIGS. 1-3) shown in the locked position and clipped onto an article, such as a pants pocket 101, with material of the pants pocket 101 received into the clip member 10' to clip the clip member 10' (and an item (e.g., 101 in FIG. 5) attached to the clip member 10') to the pants pocket 101.

The clip member 10' is shown as facing from (or clipped to) an outside surface of the pants pocket 101 (and thus an attached item, such as a mobile phone or the like, may be inside the pants pocket 101). However, the user may optionally clip the clip member 10' to an inside surface of the pants pocket 101 and face inside the pants pocket 101 (and thus an attached item may be outside the pants pocket 101).

Accordingly, various embodiments provide a convenient, yet secure way to attach and detach a wide variety of items personal equipment, mobile devices, and accessories including, but not limited to tools, electronic devices, weapons, gear pouches, and safety equipment to a user or article associated with the user.

With reference to FIGS. 1-7, it should be noted that the terms "locked position," "engaged position," and similar terms may be used interchangeably. Furthermore, such terms, such as "locked position," unless otherwise noted, may refer to a position or state of the clip member 10 (or the clip member 10') in which it is ready to be clipped to an article or the like and/or to a position or state of the clip member 10 in which the clip member 10 is already clipped to the article.

The components, such as the first member 20 and the second member 30, of the clip member 10 (or the clip member 10') may be made according to known methods for making clips or the like. For instance, the first member 20 and/or the second member 30 may be stamped out, cut, or otherwise formed from a piece of metal (or other material) and then bent into appropriate form. As another example, the first member 20 and/or the second member 30 may be molded into appropriate form.

In various embodiments, the clip member 10 (or 10'), item, and article may be connected together or disconnected in any suitable order. For instance, the user may first attach the clip member 10, for example as previously described, to the item, and then clip the clip member 10 and the item to the article. Alternatively, the clip member 10 may be clipped to the article, and then be attached to the item. Likewise, to disconnect the components, the user may first unclip the clip member 10 from the article. Then, the user may detach the clip member 10 from the item (or clip the clip member 10 and the item to another article). Alternatively, the user may detach the clip member 10 from the item and then unclip the article (or attach the clip member 10 and the article to another item).

In various embodiments, components of the clip member 10 (or 10'), may be assembled or disassembled in any suitable order. For example, the attachment body of the base 28 may be attached to a flashlight (or other item). Then the clip member 10 may be clipped to the article. Then the clipped member 10 or the article may be connected with the attachment body and the flashlight.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A clip for attachment to an item and for selectively securing the item to an article, the clip comprising:
   a first member configured to attach to an item, the first member having a tongue that is arranged adjacent the item when the first member is attached to the item, the tongue configured to allow an article to be in contact with the tongue when the article is received between the tongue and the item when the first member is attached to the item;
   a second member pivotally attached to the first member, the second member having at least one engagement surface for engaging the article, when the first member is attached to the item and the article is received between the tongue and the item;
   and a bias member arranged to bias the second member to pivot in a direction to urge the at least one engagement surface of the second member toward the article to engage the article, when the first member is attached to the item and the article is received between the tongue and the item, wherein the second member includes a pressing area where a force may be applied to disengage the second member from the article to remove the article from being located between the tongue and the item.

2. The clip as recited in claim 1, wherein the tongue is biased toward the item, when the first member is attached to the item.

3. The clip as recited in claim 1, wherein the first member comprises a base portion having a first surface and a second surface, the second surface attachable to the item, the first surface facing away from the item when the second surface is attached to the item; and
   wherein the tongue is biased toward the first surface of the base.

4. The clip as recited in claim 1, wherein the first member comprises a base portion having a first surface and a second surface, the second surface attachable to the item, the first surface facing away from the item when the second surface is attached to the item; and
   wherein the bias member is arranged to bias the second member to pivot the at least one engagement surface of the second member toward the first surface of the base portion.

5. The clip as recited in claim 4, wherein the second member includes a surface for receiving a force from a user in a direction for pivoting the second member relative to the first member against a bias force of the bias member, to urge the at least one engagement surface of the second member away from the first surface of the base portion.

6. The clip as recited in claim 1, wherein the bias member comprises a portion of the first member configured to provide a bias force against the second member.

7. The clip as recited in claim 1, wherein the first member and the bias member comprise a unitary structure formed from a single piece of metal.

8. The clip as recited in claim 1, wherein the at least one engagement surface of the second member comprises two engagement surfaces.

9. The clip as recited in claim 1, wherein the at least one engagement surface of the second member has a generally pointed tip for engaging the article when the first member is attached to the item and the article is received between the tongue and the item.

10. The clip as recited in claim 1, wherein the second member includes a surface for receiving a force from a user in a direction for pivoting the second member relative to the first member against a bias force of the bias member, to urge the at least one engagement surface of the second member away from the article, when the first member is attached to the item and the article is received between the tongue and the item.

11. The clip as recited in claim 1, wherein the second member has a surface configured to receive a force from the article to pivot the second member relative to the first member in the direction to urge the at least one engagement surface of the second member toward the article and increase a force of engagement of the at least one engagement surface on the article to further inhibit the article from being removed from between the tongue and the item, when the first member is attached to the item and the article is received between the tongue and the item.

12. The clip as recited in claim 1, wherein the second member includes a surface for receiving a force from a user in a direction for pivoting the second member relative to the first member against a bias force of the bias member; and wherein the second member is configured to allow the article to be engaged by the at least one engagement surface of the second member before receiving the force from the user on the surface of the second member.

13. The clip as recited in claim 1, wherein the second member is configured to automatically engage the article with the at least one engagement surface as the article is received between the at least one engagement surface and the item.

14. The clip as recited in claim 1, wherein the tongue and the second member are arranged to be in contact with the article when the second member is engaged with the article.

15. The clip as recited in claim 3, wherein the second surface of the base has an adhesive material such that the second surface adheres to the item.

16. The clip as recited in claim 3, wherein the first surface of the base is in contact with the tongue when the article is located away from the first surface of the base and the tongue.

17. The clip as recited in claim 1, wherein the tongue is biased towards the item to squeeze the article between the tongue and the item, when the first member is attached to the item and the article is received between the tongue and the item.

18. A clip for attachment to an item and for selectively securing the item to an article, the clip comprising:
   a first member configured to attach to an item, the first member having a tongue that is arranged adjacent the item when the first member is attached to the item, the tongue configured to allow an article to be in contact with the tongue when the article is received between the tongue and the item when the first member is attached to the item;
   a second member pivotally attached to the first member, the second member having at least one engagement surface for engaging the article, when the first member is attached to the item and the article is received between the tongue and the item;
   and a bias member arranged to bias the second member to pivot in a direction to urge the at least one engagement surface of the second member toward the article to engage the article, when the first member is attached to the item and the article is received between the tongue and the item, wherein the first member comprises a base portion having a first surface and a second surface, the second surface attachable to the item, the first surface facing away from the item when the second surface is attached to the item; the tongue is biased toward the first surface of the base; and the second surface of the base has an adhesive material such that the second surface adheres to the item.

19. A clip for attachment to an item and for selectively securing the item to an article, the clip comprising:
   a first member configured to attach to an item, the first member having a tongue that is arranged adjacent the item when the first member is attached to the item, the tongue configured to allow an article to be in contact with the tongue when the article is received between the tongue and the item when the first member is attached to the item;
   a second member pivotally attached to the first member, the second member having at least one engagement surface for engaging the article, when the first member is attached to the item and the article is received between the tongue and the item;
   and a bias member arranged to bias the second member to pivot in a direction to urge the at least one engagement surface of the second member toward the article to engage the article, when the first member is attached to the item and the article is received between the tongue and the item, wherein the first member comprises a base portion having a first surface and a second surface, the second surface attachable to the item, the first surface facing away from the item when the second surface is attached to the item; the tongue is biased toward the first surface of the base; and the first surface of the base is in contact with the tongue when the article is located away from the first surface of the base and the tongue.

* * * * *